United States Patent Office 3,843,401
Patented Oct. 22, 1974

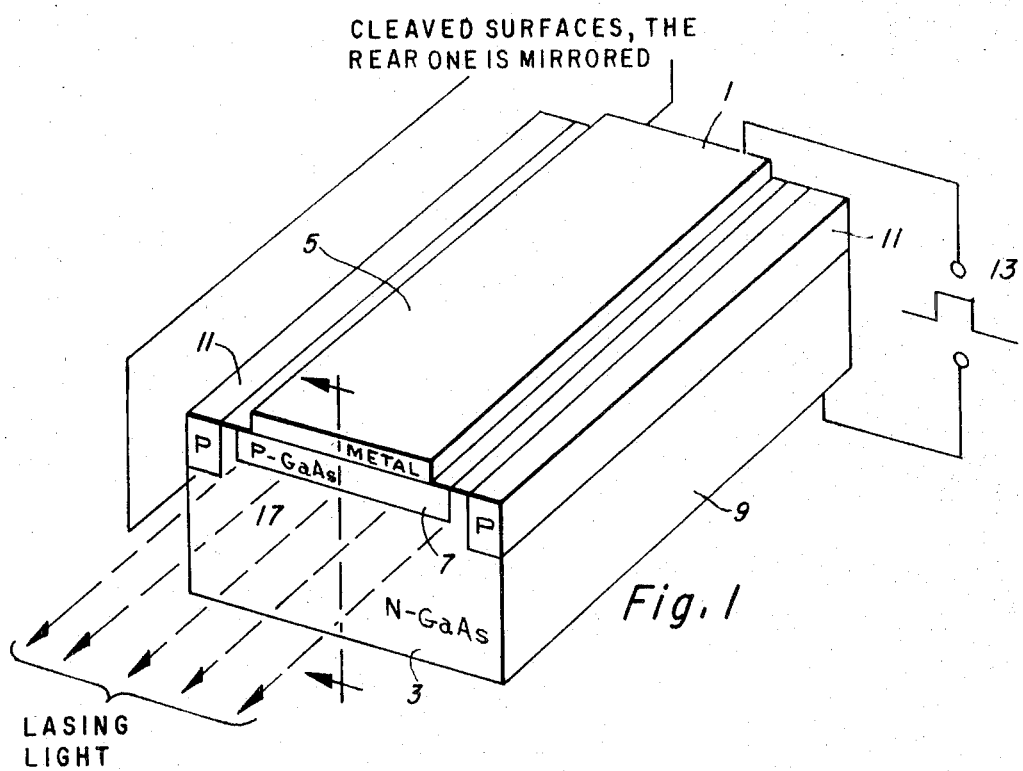
Fig. 1
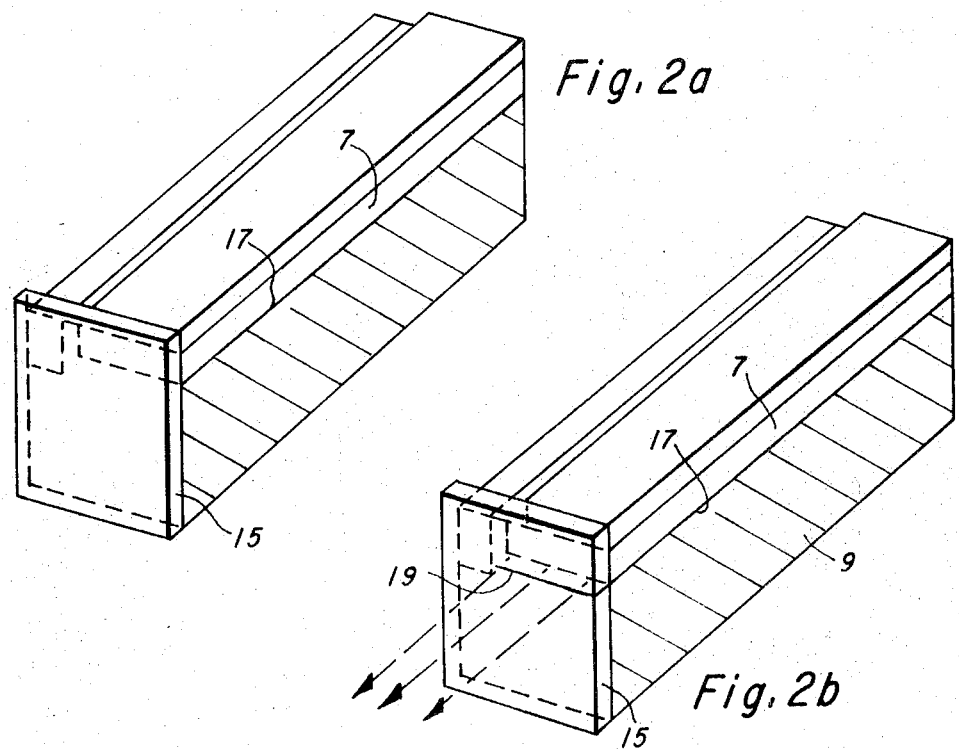
Fig. 2a
Fig. 2b

3,843,401
BISMUTH MASKING TECHNIQUE FOR USE ON INJECTION LASER DIODES AS MEANS OF UNIFORMITY EVALUATION AND SPONTANEOUS CONTROL AND PRODUCT
Ronald L. Carroll, Plano, Tex., assignor to Texas Instruments Incorporated, Dallas, Tex.
Filed July 14, 1972, Ser. No. 271,870
Int. Cl. B44c 1/20; B44d 1/18
U.S. Cl. 117—227   8 Claims

ABSTRACT OF THE DISCLOSURE

The disclosure relates to a method of precisely locating the lasing emission region of an injection laser diode wherein an anti-reflection coating is applied onto the emitting face of an injection laser diode. A film of bismuth from about 300 to about 750 angstroms thickness is then applied over the anti-reflection coating and the laser is then pulsed with a single pulse of sufficient energy to cause an emitted laser light to pass through the junction of the diode. This light is absorbed in the bismuth film, thereby causing evaporation of the bismuth film in the region of light absorption only. The active region from which the substantially monochromatic light is emitted is therefore visible under normal microscopic conditions and can be utilized in various ways to perform functions hitherto performed with great difficulty.

---

This invention relates to a method of masking about the lasing emission region of an injection laser diode and the product thereof and, more specifically, to the placement of a layer of light absorbing material capable of evaporation at power levels of the laser which do not degrade the laser diode itself, the layer being either sufficiently low in electrical conductivity to be positioned directly onto the emitting face of the injection laser diode or atop an insulating layer positioned over the emission region prior to placement of the light absorbing material thereon.

Injection laser diodes are well-known in the art and have demonstrated great utility therein. Diodes of this type are characterized by providing monochromatic light along a pn junction forming the diode, such diodes also providing spontaneous light as well as the monochromatic light. Whereas the monochromatic light is provided in the plane of the pn junction of the diode, the spontaneous light, which has a much greater spectral bandwidth than the monochromatic light, is emitted from all of the surfaces of the injection laser diode not metallized for electrical contacting purposes. Injection laser diodes of the type described above often require that the exact location of the pn junction from which the monochromatic light is emitted be very accurately determined for use in external optical systems. Furthermore, it is desirable that the spontaneous emissions, which are non-monochromatic and which are dispersed over a wide solid angle, even when emitted from the lasing emission surface, be controlled to be dispersed over a smaller dispersion angle. It is also often desirable to inspect the pn junction from which the monochromatic light is emitted to determine its quality.

In accordance with the prior art, junction location in injection laser diodes was performed essentially by two methods. One such method is etching and staining a biased junction, this being a destructive test for laser diodes since the etch attacks the required smooth emitting facets. The other method is photographic viewing through a microscope with infrared film. This method is difficult to use due to the difference in focusing characteristics of visible and longer wave infrared light and is also extremely dangerous to the operator. The prior art also has no simple method for determining the quality of the pn junction of an injection laser diode.

In accordance with the present invention, the above problems of prior art injection laser diodes are substantially overcome and there is provided a method and product wherein the lasing region of a diode can be accurately located by masking of the remainder of the lasing emission region face thereof. In addition, the diffusion depth of the lasing emission region can easily be determined and non-uniform lasing junction regions are immediately obvious. Furthermore, the emission region size of the laser diode used both in the spontaneous and lasing mode is controlled, this virtually eliminating spontaneous emission from areas of the chip other than the lasing region. Briefly, the above is accomplished by providing a layer of material such as, for example, bismuth, onto the surface of the diode containing the lasing emission region, the material having a sufficiently low electrical conductivity not to affect the diode qualities and being capable of being evaporated by a single laser pulse at power levels which do not degrade the laser diode. The coating material can be either placed directly onto the surface of the diode or can be placed above an insulating layer in the event the material has too high an electrical conductivity.

In operation, a layer of the type of material described above such as, for example, bismuth, of a thickness of from about 300 to about 750 angstroms is deposited by evaporation or the like onto the diode surface containing the lasing emission region. The diode is then pulsed with a single pulse of sufficient energy, preferably in the area of 50 to 80 milliwatts per mil of junction length, this evaporating the bismuth film only in the areas in which the bismuth absorbed the monochromatic light from the diode junction. The active region is thus visible under normal microscopic conditions.

It is therefore an object of this invention to provide an injection laser diode having a surface thereof containing the lasing emission surface completely masked except at the lasing emission region.

It is a further object of this invention to provide a method for exact location of the lasing emission region of an injection laser diode.

It is a yet further object of this invention to provide a method for determining the effective diffusion depth of the junction of an injection laser diode.

It is a still further object of this invention to provide a method for easily testing the junction of an injection laser diode to determine the junction quality (i.e., non-uniform lasing junction regions).

It is a yet further object of this invention to provide an injection laser diode which is easily aligned with an external optical system.

It is a still further object of this invention to provide an injection laser diode which is easily tested without potential harm to the operator.

It is an even further object of this invention to provide a method for controlling the emission source size of a laser diode.

It is a yet further object of this invention to provide an injection laser diode having the properties as enumerated above.

The above objects and still further objects of the invention will immediately become apparent to those skilled in the art after consideration of the following preferred embodiment thereof, which is provided by way of example and not by way of limitation, wherein:

FIG. 1 is a view of a typical prior art diffused injection laser diode which can be used in accordance with the present invention;

FIG. 2a is a cutaway perspective view showing the front face of the laser of FIG. 1 after deposition of a layer of bismuth thereon;

FIG. 2b is a cutaway perspective view of the laser of FIG. 2a after pulsing;

Figure 3A:
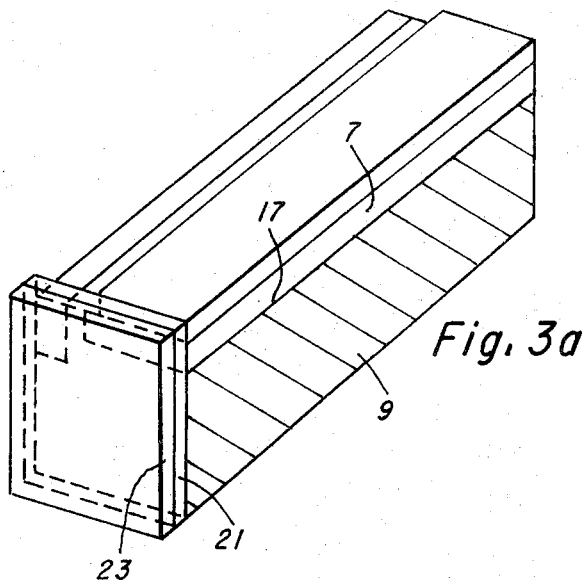
FIG. 3a is a cutaway perspective view of a second method of forming a laser in accordance with the present invention including an insulating layer and a bismuth layer.

Referring first to FIG. 1, there is shown a typical prior art diffused injection laser diode having a rear mirrored surface 1 and a front cleaved surface 3. The laser includes a metal electrode 5 over a p-type gallium arsenide region 7, the p-type region being embedded in an n-type gallium arsenide substrate 9. P-type mode stoppers 11 are provided at the two side edges of the laser to prevent lateral lasing emission. A source of pulses 13 is provided between the metal electrode and the n-type gallium arsenide substrate. It should be understood that other well-known types of laser diodes can be utilized as well as that depicted in FIG. 1. Some examples are heterostructure injection laser diodes, these including single heterojunction and double heterojunction lasers, LOC lasers, etc.

Referring now to FIG. 2a, there is shown a laser of the type shown in FIG. 1 wherein a thin layer of bismuth 15 has been deposited, such as by evaporation in well-known manner, onto the front surface or cleaved surface of the laser. It should be understood that though bismuth is used in the preferred embodiment of FIG. 2a, any material which has sufficiently low electrical conductivity so as not to destroy the diode properties of the laser across the junction can be used so long as this material can also be evaporated by a light pulse from the laser of sufficiently low intensity so as not to destroy the laser diode itself.

Once the bismuth layer 15 has been deposited onto the front surface of the laser, a high intensity laser pulse, provided by a power level of 58-80 milliwatts per mill of junction length, is provided. Since this power is generated only along the pn junction 17 of the laser, the bismuth or other suitable material will be evaporated only in the region of the junction 17 as shown in FIG. 2b. It can therefore be seen that a window 19 will be provided only along the pn junction 17 of the laser. Accordingly, the junction 17 can be easily located for later alignment with optical systems. Furthermore, in the event that the laser has a non-uniform junction, it can be seen that if the pn junction is in some manner defective, such as being non-uniform or the like, and that thereby the lasing action does not take place at sufficient power levels along the entire length of the junction, the window 19 provided by the evaporation of the bismuth will be non-uniform and thereby provide this information. In this manner, the pn junction can be accurately located as to position and depth as well as being characterized as to quality with minimum effort.

Figure 3B:
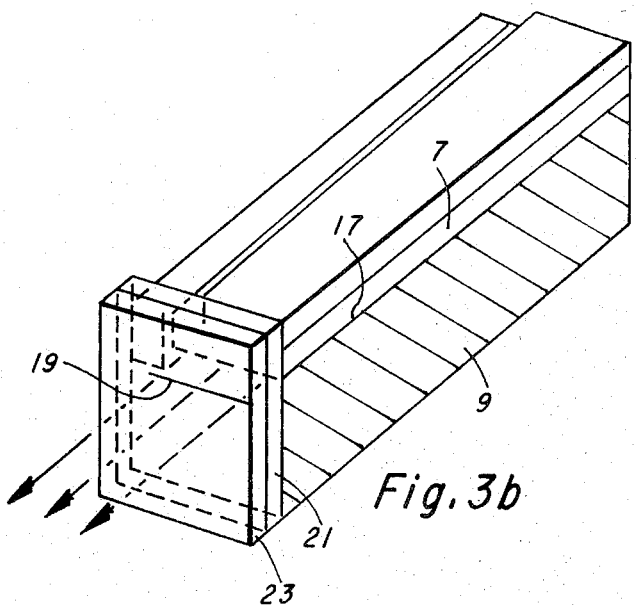
FIG. 3b is a cutaway perspective view of FIG. 3a after the laser has been pulsed.

Referring now to FIGS. 3a and 3b, there is shown a second type of masked laser wherein, in FIG. 3a, there is initially deposited an electrically insulating film 21 atop which is placed a layer of material 23 which is easily evaporated by a laser pulse in the same manner as discussed with regard to FIGS. 2a and 2b. The insulating layer is required in those cases where the masking material 23 used has sufficiently high electrical conducting properties to destroy the diode action at the pn junction 17. In this case it is necessary to isolate the evaporable layer from the actual diode surface. The material 23 placed over the insulating layer can be bismuth or any other material having the properties above enumerated.

Referring now to FIG. 3b, the laser is again pulsed with a sufficiently high density pulse to evaporate the bismuth at the region of the junction in the same manner as described before with regard to FIGS. 2a and 2b. There is accordingly provided a window 19 at the region of the junction, the window having the same properties as enumerated above with regard to FIGS. 2a and 2b.

The thickness of the bismuth or equivalent material layer 23 or 15 is preferably from about 300 to about 750 angstroms, a bismuth film of this thickness not having sufficient electrical conductivity to appreciably alter the I–V characteristics of the diode, even when no protective dielectric coating is applied to the emitting face 3. However, a good quality anti-reflection coating is preferably first applied prior to the bismuth.

The bismuth is evaporated by a single pulse of sufficient energy. Due to the low melting temperature of bismuth and its relatively low reflectivity (high absorption for a metal), the bismuth film absorbs the emitted laser light and evaporates in the junction region, leaving the remainder of the emitting surface in a diode covered by the bismuth mask. The active region is thereby visible with normal microscopy. The only collectable light (lasing and spontaneous) therefore must exit the diode from the cleared active area of the diode face or window 19.

The levels at which the lasing pulse is provided must be at power levels which will not degrade the laser diode itself before the bismuth is evaporated. The bismuth is evaporated at power levels of about 50 to about 80 milliwatts per mil a junction length and units of unmirrored rear faces evaporated the bismuth at about 67 milliwatts per mil of junction length.

It can be seen that in accordance with the present invention there is provided a relatively inexpensive and simple method for location of the junction of an injection laser diode as well as for testing the quality of the junction and forcing the light from the emitting surface to be emitted from a restricted region at the junction.

Although bismuth is a preferred metal for use in locating the emission region, any substance having a substantial absorption capacity for light of the emitted wavelength, moderate to poor thermal conductivity, and a vapor pressure which is sufficiently high to permit evaporation thereof, is suitable for purposes of the invention. Specific examples include antimony, cadmium, tellurium, tin, lead, zinc, and most common solder alloys.

Though the invention has been described with respect to certain specific embodiments thereof, many variations and modifications thereof will immediately become apparent to those skilled in the art. It is therefore the intention that the appended claims be interpreted as broadly as possible in view of the prior art to include all such variations and modifications.

What is claimed is:

1. A method of masking the lasing region of an injection laser diode which comprises the step of:
    (a) coating the lasing surface of said diode with a material of sufficiently low electrical conductivity not to affect the diode properties of said diode and evaporable at power levels of said diode which do not degrade said diode; and
    (b) pulsing said diode at an energy level sufficiently high to evaporate said material, whereby said material evaporates along the lasing region of said diode.

2. A method as set forth in Claim 1 wherein step (a) includes the steps of coating said lasing surface with an electrically insulating material and then placing a layer of electrically conducting masking material over said insulating material, said electrically conducting material being evaporable by said pulse.

3. A method as set forth in Claim 1 wherein said material is bismuth.

4. A method as set forth in Claim 2 wherein said electrically conducting material is bismuth.

5. An injection laser diode which comprises:
    (a) a surface including a pn junction extending onto said surface; and
    (b) pulsing said diode at an energy level sufficiently high to evaporate said material, whereby said material properties of said diode and evaporable at power levels of said diode which do not degrade said diode, said layer defining a window at said junction.

6. An injection laser diode as set forth in Claim 5 wherein said layer comprises a first layer of electrically insulating material and a second layer of masking material over said first layer, said second layer being evaporable at power levels of said diode which do not degrade said diode.

7. An injection laser diode as set forth in Claim 5 wherein said layer is formed from bismuth.

8. An injection laser diode as set forth in Claim 6 wherein said second layer is formed from bismuth.

References Cited

UNITED STATES PATENTS

| | | | |
|---|---|---|---|
| 3,701,047 | 10/1972 | Caplan | 317—235 N |
| 3,650,796 | 3/1970 | Jackson | 117—8 |

OTHER REFERENCES

Murinace, IBM Technical Disclosure Bull., Vol. 8, No. 11, *Electroluminescent Diodes & Arrays*, p. 1664 (1966).

LEON D. ROSDOL, Primary Examiner

M. F. ESPOSITO, Assistant Examiner

U.S. Cl. X.R.

29—569 L, 582, 584; 73—432 L; 117—8, 38, 93.3, 200, 212, 217; 317—235 N, 235 Q; 331—94.5 H